United States Patent

Wilson

[15] 3,663,193
[45] May 16, 1972

[54] STRENGTHENED PHOTOSENSITIVE OPAL GLASS

[72] Inventor: Lois E. Wilson, Painted Post, N.Y.
[73] Assignee: Corning Glass Works, Corning, N.Y.
[22] Filed: June 30, 1969
[21] Appl. No.: 837,943

[52] U.S. Cl. .................................65/30, 65/32, 65/33, 65/DIG. 2, 65/DIG. 7
[51] Int. Cl. ...................................C03c 15/00, C03b 29/00
[58] Field of Search .................65/33, DIG. 2, 30, 32, DIG. 7

[56] References Cited

UNITED STATES PATENTS

| | | | |
|---|---|---|---|
| 3,161,528 | 12/1964 | Eppler | 65/33 X |
| 3,282,711 | 11/1966 | Lin | 65/33 X |
| 3,445,209 | 5/1969 | Asunmaa | 65/33 |
| 3,454,386 | 7/1969 | Ernsberger | 65/33 |
| 3,464,807 | 9/1969 | Pressau | 65/33 |
| 3,464,880 | 9/1969 | Rinehart | 65/33 X |

OTHER PUBLICATIONS

Handbook of Glass Manufacture, Vol. II, pp. 192 to 199.

*Primary Examiner*—Frank W. Miga
*Attorney*—Clarence R. Patty, Jr. and Clinton S. Janes, Jr.

[57] ABSTRACT

This invention relates to a method for making a composite opal glass article exhibiting very high mechanical strength and being composed of an interior portion and an integral surface layer containing crystals having a lower coefficient of thermal expansion than the glass such that the surface layer is under compression, the glass falling within the $Li_2O$–$Al_2O_3$–$SiO_2$–$CeO_2$ composition area and including at least one photosensitive metal selected from the group consisting of copper, silver, and gold.

4 Claims, 2 Drawing Figures

INVENTOR.
Lois E. Wilson
BY
ATTORNEY

STRENGTHENED PHOTOSENSITIVE OPAL GLASS

Thermally opacifiable photosensitive glasses are well-known in the art. Examples of such glasses can be found in U.S. Pat. Nos. 2,515,939, 2,515,940, 2,515,941, 2,651,145 and 2,651,146. In the main, these prior glasses have utilized the sensitivity of the noble metals, particularly copper, silver, and gold, to short wave radiations and, specifically, ultraviolet radiations. Thus, glasses containing minute amounts of one or more of these noble metals are exposed to ultraviolet radiation and then heat treated in accordance with rather strictly defined schedules such that colloidal particles of the metals are first formed which act as nucleating sites for the subsequent growth of opacifying crystals thereon. Hence, alkali metal fluoride, lithium silicate, and barium silicate crystals have been grown on these metal particles.

Through the judicious selection of the crystals developed in the glass, advantage can be taken of the difference in solubility between the crystals and the original glass. This feature, as is explained in U.S. Pat. Nos. 2,628,160 and 2,684,911, has permitted the chemical machining or sculpturing of glass into designs and filigrees of various sorts. Most generally, lithium metasilicate has been the crystal phase precipitated out since the solubility of those crystals in dilute hydrofluoric acid can be one hundred times more rapid than that of the original glass.

In common with the conventional opal glasses, these photosensitive opal glasses were low in actual crystal content. However, as was disclosed more recently in U.S. Pat. No. 2,971,853, very highly crystalline articles can be obtained, i.e., articles wherein the crystal content comprises the predominant proportion of the articles, by heat treating certain photosensitive glasses at temperatures substantially higher than those employed in imparting opacity to the glass. Thus, certain glasses in the $Li_2O-Al_2O_3-SiO_2$ composition field containing copper and/or silver and/or gold can first be exposed to ultraviolet radiation, then heat treated to develop nuclei of metal particles and grow opacifying crystals thereon and, finally, heat treated at a higher temperature to cause further crystallization plus the conversion of the opacifying crystals to a different crystal phase. In this way, a glass-ceramic article is produced.

I have discovered that glass articles falling within a narrow area of the $Li_2O-Al_2O_3-SiO_2$ composition field containing minute amounts of copper and/or silver and/or gold and a specific amount of $CeO_2$ will exhibit photosensitivity and can be heat treated in such a manner to produce, in situ, a surface layer containing crystals of beta-eucryptite solid solution and/or beta-quartz solid solution and/or beta-spodumene solid solution accompanied with lithium metasilicate and/or lithium disilicate crystals. Inasmuch as the crystals of beta-eucryptite, beta-quartz, and beta-spodumene solid solution exhibit coefficients of thermal expansion much lower than that of the parent glass (often approaching $0 \times 10^{-7}/°C.$), compressive stresses are set up in this surface layer which result in a great overall improvement in the mechanical strength of the article.

Hence, in its broadest aspects, my invention comprises melting a batch for a glass consisting essentially, by weight on the oxide basis, of about 5-15% $Li_2O$, 8-22% $Al_2O_3$, 55-80% $SiO_2$, and 0.3-4% $CeO_2$ with at least one photosensitive metal in the indicated proportion selected from the group consisting of about 0.001-0.03% gold, computed as Au, about 0.001-0.3% silver, computed as Ag, and about 0.001-1% copper, computed as $Cu_2O$, simultaneously cooling the melt and forming a glass article of a desired configuration therefrom, exposing said article to short wave radiations, suitably ultraviolet radiations, heating the exposed article to about 500°-600° C. for a time sufficient to insure good nucleation, and then heating the nucleated article to about 550°-725° C. for a time sufficient to attain crystallization of beta-eucryptite and/or beta-quartz and/or beta-spodumene solid solution along with lithium metasilicate and/or lithium disilicate in a surface layer within the article.

Figure 1:
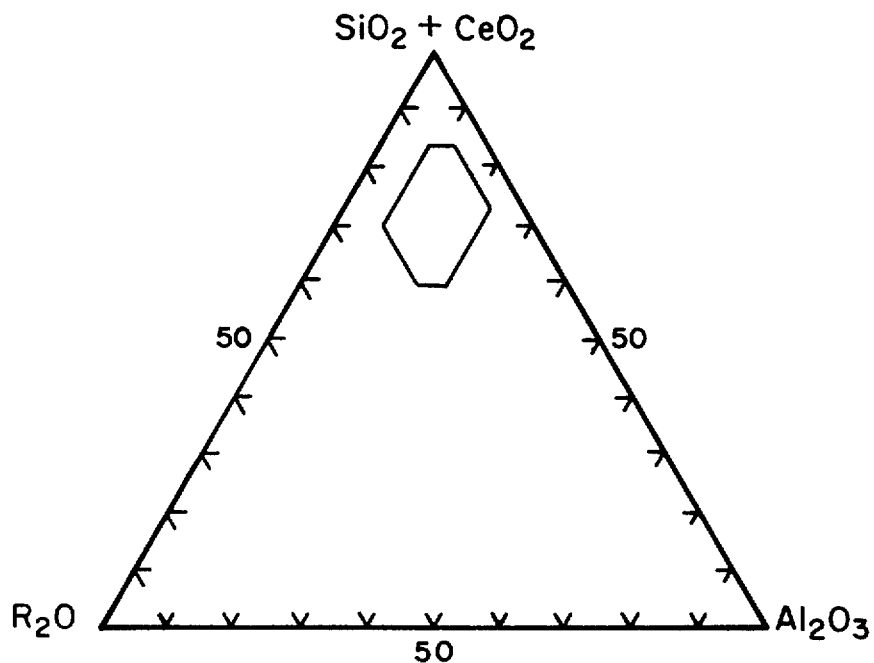
FIG. 1 is a composition diagram illustrating the ranges of the base glass components which are critical to the invention.

Returning to FIG. 1, it can be seen that, for convenience, the amounts of fining agents and the photosensitive metals have been omitted and the remaining components of the base glass have been reduced to a three-component system by combining the $SiO_2$ and $CeO_2$ as one component, having the $Al_2O_3$ represent a second component, and combining the $Li_2O$ with the other alkali metal oxides described below under the designation $R_2O$, which is that designation commonly used in the art to represent such oxides.

Figure 2:
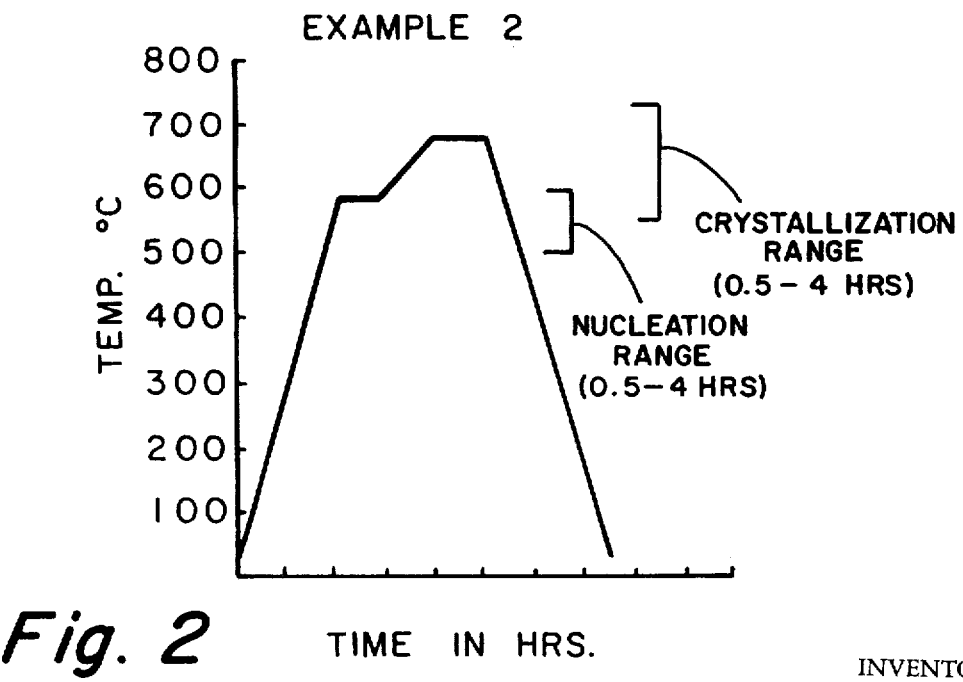
FIG. 2 illustrates the time-temperature treatment used in a preferred embodiment of the invention.

FIG. 2 illustrates the time and temperature ranges used to bring about the nucleation and crystallization in the examples described below with a preferred embodiment, Example 2, shown falling within the nucleation and crystallization heat treatment ranges.

The ranges of the base glass components are critical to the invention. Thus, where $Li_2O$ is present in less than 5 percent by weight, the glass is not photosensitive and where $Li_2O$ is utilized in amounts more than 15 percent by weight, the difference in expansion between the surface layer and the interior portion becomes too great and spalling can occur. Where the $Al_2O_3$ content is less than about 8 percent by weight, beta-eucryptite and/or beta-quartz and/or beta-spodumene solid solution crystals will not be formed and $Al_2O_3$ contents greater than about 22 percent by weight destroy the photosensitivity of the glass. With less than about 0.3% $CeO_2$, the ultraviolet absorption resulting therefrom is not sufficient to limit the crystallization of beta-eucryptite and/or beta-quartz and/or beta-spodumene solid solution to a relatively thin surface layer (Of course, at the higher heat treating temperatures referred to above with respect to U.S. Pat. No. 2,971,853, a glass-ceramic article can be produced.) Thus, by varying the amount of $CeO_2$, the depth of the crystalline layer formed after heat treatment can be controlled due to the ultraviolet absorption effect of $CeO_2$. At more than 4 percent by weight $CeO_2$, the ultraviolet absorption becomes too great to enable the production of a crystalline surface layer of practical thickness, i.e., of at least about 0.001 inch.

The indicated maximum amounts of the photosensitive metals have been adjudged to be the practical upper limits for such. Still larger proportions of these metals may be successfully utilized but are really unnecessary since the excess metal will separate out to color the glassy matrix. However, quantities of these metals less than the indicated minima are essentially inoperative in making the glasses photosensitive.

In manufacturing strengthened glass articles in accordance with the method of my invention, a glass of the proper composition is melted and shaped to a desired form by one of the conventional glass-forming processes such as blowing, drawing, rolling, or pressing. If further hot working of the glass is required to produce the desired article, e.g., sealing one article to another or sagging a flat sheet to a certain curvature, such further operations should be undertaken prior to irradiation and subsequent heat treatment. The finished glass article can be strengthened through my invention without substantial change in size or shape.

Since lithium metasilicate and/or lithium disilicate crystals are formed along with the beta-eucryptite and/or beta-quartz and/or beta-spodumene solid solution crystals, chemical machining or sculpturing of the articles of this invention can also be practiced utilizing the solubility differential thereof. Hence, a glass article covered with a stencil impervious to ultraviolet radiation can be irradiated, heat treated, and then contacted with dilute hydrofluoric acid. The crystallized areas will quickly be etched away. Then the entire article can be irradiated and heat treated such that a surface compression layer is developed over all of the article, yielding a high strength, sculptured article.

Inasmuch as lithium metasilicate crystals are more readily soluble in dilute hydrofluoric acid than are lithium disilicate crystals, where chemical machining of the article will be performed the development of lithium metasilicate crystals is much to be preferred. Therefore, since the presence of $Na_2O$ and/or $K_2O$ promotes the growth of lithium metasilicate crystals rather than lithium disilicate, 0.5–8% by weight $R_2O$ is commonly added to the glass composition wherein $R_2O$ consists of 0–4% $Na_2O$ and 0–8% $K_2O$.

Various other compatible metal oxides may, optionally, be present in amounts totalling not more than about 10 percent by weight. Such oxides include MgO, CaO, SrO, BaO, $B_2O_3$, $P_2O_5$, CdO, and ZnO. $As_2O_3$ should preferably, be absent as it destroys the sensitivity of the glass. $Sb_2O_3$ may be added to the batch in amounts totalling about 2 percent by weight to function as a fining agent.

Table I records glass compositions, expressed in parts by weight on the oxide basis, operable in my invention. The quantities of the photosensitive metals, being less than one, are expressed as decimals to two or three significant places. However, this practice is without import in expressing the major components. Since each composition totals approximately 100, for practical purposes the values cited can be deemed to be percent by weight.

The batch materials for the glasses reported in Table I were ballmilled together and melted in open platinum crucibles for 6 hours at 1,500° C., the melts being stirred to insure homogeneity. The batch constituents may comprise any materials, either oxides or other compounds, which, on being melted together, will be converted to the desired oxide in the proper proportions. The gold and silver were commonly added as a halide. The gold and silver-containing glasses were melted under oxidizing conditions whereas copper-containing glasses would be melted under reducing conditions, as is customary in the field of photosensitive opal glasses. The coefficients of thermal expansion of these glasses have been measured between about $75-100 \times 10^{-7}/°C$.

Glass sheet of about 4-inch width and three-sixteenths inch thickness was drawn and transferred to an annealer operating at 450° C. Strips about 3/16 inch by 1 inch by 4 inches and bars about 3/16 inch by 3/16 inch by 4 inches were then cut from this sheeting and exposed for times varying from about 5 minutes to 10 hours to an 800-watt high pressure mercury arc lamp marketed by the Westinghouse Electric Company. Thereafter, the irradiated strips and bars were heated at about 5° C./minute to the nucleation and crystallization temperature recorded in Table II. In general, a dwell period of at least one-half hour at temperatures between about 500°–600° C. is required to insure the substantial development of nuclei. And, whereas exposure times as long as 12 hours within the nucleation range can be employed without harm to the glass, such long exposures are unnecessary and 4 hours has been deemed to be a practical maximum heating time. Likewise, whereas exposure times longer than 12 hours within the crystallization range can be successfully utilized, such long heating times do not appear to yield any improvement in the article so about ½–4 hours has been considered to be commercially practical time.

Table II reports the ultraviolet exposure times and treatments to which each example was subjected along with the crystal phases present in the surface layer as determined through X-ray diffraction analysis and the mechanical strength of the articles as represented by modulus of rupture measurements (psi) conducted in the conventional manner on the bar samples.

TABLE II

| Example number | Ultra-violet exposure time | Heat treatment, °C. for 1 hour | Crystal phases | Modulus of rupture |
|---|---|---|---|---|
| 1 | 5 minutes | 580 / 680 | β-eucryptite solid solution. | 47,800 |
| 2 | do | 580 / 680 | β-eucryptite solid solution lithium metasilicate. | 51,700 |
| 3 | 45 minutes | 550 / 580 | β-eucryptite solid solution. | 29,100 |
| 4 | 10 hours | 550 / 650 | β-eucryptite solid solution lithium metasilicate. | 47,000 |
| 5 | 30 minutes | 550 / 650 | β-eucryptite solid solution. | 31,600 |
| 6 | 60 minutes | 550 / 610 | β-eucryptite solid solution lithium metasilicate | 25,600 |
| 7 | 45 minutes | 550 / 610 | β-eucryptite solid solution. | 27,200 |
| 8 | 30 minutes | 550 / 580 | ....do.......... | 29,200 |
| 9 | 45 minutes | 550 / 580 | ....do.......... | 37,500 |
| 10 | 2 hours | 550 / 580 | ....do.......... | 38,100 |
| 11 | 6 hours | 550 / 580 | ....do.......... | 38,700 |
| 12 | 5 hours | 550 / 610 | ....do.......... | 40,000 |

The effectiveness of my invention in providing an opal glass of very high mechanical strength is unequivocally demonstrated when the modulus of rupture values recited in Table II are compared with measurements of 5,000–6,000 psi obtained on glass bars which had not been irradiated and subsequently heat treated.

Example 2 is my preferred composition for two reasons: First, very high mechanical strengths can be developed therein; and, second, the presence of a considerable amount of the lithium metasilicate phase permits good chemical machining of the glass.

Electron microscopy has indicated the surface layer to be greater than 50 percent by weight crystalline with the crystals, themselves, being substantially all finer than 20 microns in diameter. A rather sharp line of demarcation can be observed between the surface compression layer and the interior portion of the article through a microscopic examination of the article in cross section. A depth of layer of at least 1 mil has been found necessary to impart a practical increase in strength to the glass article since, otherwise, scratches, bruises, etc., resulting from impacts received thereon in service will penetrate therethrough.

I claim:

1. A method for making a composite opal glass article exhibiting very high mechanical strength consisting of an interior portion and an integral surface compression layer containing at least one crystal phase selected from the group consisting of beta-eucryptite, beta-quartz, beta-spodumene, lithium metasilicate, and lithium disilicate which comprises:

a. melting a batch for a glass consisting essentially by weight

TABLE I

| | 1 | 2 | 3 | 4 | 5 | 6 | 7 | 8 | 9 | 10 | 11 | 12 |
|---|---|---|---|---|---|---|---|---|---|---|---|---|
| $SiO_2$ | 72.9 | 70.90 | 62.49 | 72.86 | 71.42 | 73.89 | 74.85 | 71.02 | 72.47 | 70.67 | 70.32 | 71.63 |
| $Al_2O_3$ | 11.8 | 14.14 | 20.09 | 12.10 | 12.11 | 12.11 | 12.11 | 12.34 | 11.62 | 12.27 | 12.21 | 11.49 |
| $Li_2O$ | 8.6 | 8.36 | 9.33 | 6.96 | 9.33 | 9.33 | 9.32 | 9.35 | 8.81 | 9.31 | 9.26 | 8.70 |
| $Na_2O$ | 0.9 | 0.89 | 1.54 | 1.55 | 0.60 | 1.55 | 0.60 | 1.10 | 1.04 | 1.09 | 1.09 | 1.03 |
| $K_2O$ | 1.8 | 1.79 | 3.98 | 3.98 | 3.98 | 0.55 | 0.55 | 2.12 | 2.00 | 2.11 | 2.10 | 1.98 |
| ZnO | 2.7 | 2.67 | 1.00 | 1.00 | 1.00 | 1.00 | 1.00 | 3.00 | 2.82 | 2.98 | 2.97 | 2.79 |
| $Sb_2O_3$ | 0.4 | 0.36 | 0.39 | 0.39 | 0.39 | 0.39 | 0.39 | 0.39 | 0.37 | 0.39 | 0.39 | 0.37 |
| $CeO_2$ | 0.9 | 0.89 | 0.99 | 0.99 | 0.99 | 0.99 | 0.99 | 0.99 | 0.70 | 0.99 | 1.48 | 1.85 |
| Au | 0.0013 | 0.0013 | 0.0013 | 0.0013 | 0.0013 | 0.0013 | 0.0013 | 0.0013 | 0.0013 | 0.0013 | 0.0013 | 0.0013 |
| Ag | 0.12 | 0.12 | 0.12 | 0.12 | 0.12 | 0.12 | 0.12 | 0.12 | 0.12 | 0.12 | 0.12 | 0.12 | on the oxide basis, of about 5–15% $Li_2O$, 8–22% $Al_2O_3$, 55–80% $SiO_2$, 0.3–4% $CeO_2$, and at least one photosensitive metal in the indicated proportions selected from the group consisting of 0.001–0.03% gold, computed as Au, 0.001–0.3% silver, computed as Ag, and 0.001–1% copper, computed as $Cu_2O$;

b. simultaneously cooling the melt to a glass and shaping an article therefrom;

c. exposing said article to ultraviolet radiations for at least about 5 minutes;

d. heating said irradiated article to about 500°–600° C. for at least about one-half hour to achieve substantial nucleation within a surface layer on the article; and, finally, e. heating said nucleated article to about 550°–725° C. for at least about one-half hour to attain crystallization within said surface layer.

2. The method, according to claim 1, wherein the time sufficient to achieve the substantial nucleation ranges about 0.5–4 hours.

3. The method, according to claim 1, wherein the time sufficient to attain the crystallization ranges about 0.5–4 hours.

4. A composite opal glass article exhibiting very high mechanical strength prepared by the method of claim 1.

* * * * *